(12) United States Patent
Buehring

(10) Patent No.: US 9,902,107 B2
(45) Date of Patent: Feb. 27, 2018

(54) METHOD FOR PRODUCING A THERMOPLASTIC FILM

(71) Applicant: BENECKE-KALIKO AG, Hannover (DE)

(72) Inventor: Juergen Buehring, Goeppingen (DE)

(73) Assignee: Benecke-Kaliko AG, Hannover (DE)

( * ) Notice: Subject to any disclaimer, the term of this patent is extended or adjusted under 35 U.S.C. 154(b) by 463 days.

(21) Appl. No.: 13/938,367

(22) Filed: Jul. 10, 2013

(65) Prior Publication Data

US 2013/0292883 A1   Nov. 7, 2013

Related U.S. Application Data

(60) Division of application No. 12/206,277, filed on Sep. 8, 2008, now Pat. No. 9,486,954, and a continuation of application No. PCT/EP2007/050325, filed on Jan. 15, 2007.

(51) Int. Cl.
| | | |
|---|---|---|
| *B29C 59/16* | (2006.01) | |
| *B29C 71/04* | (2006.01) | |
| *B29C 35/02* | (2006.01) | |
| B29C 35/08 | (2006.01) | |
| B29C 51/46 | (2006.01) | |
| B29C 51/12 | (2006.01) | |
| B29C 51/26 | (2006.01) | |
| B29C 51/00 | (2006.01) | |
| B29C 59/04 | (2006.01) | |
| B29K 23/00 | (2006.01) | |
| B29K 105/04 | (2006.01) | |
| B29K 105/24 | (2006.01) | |
| B29K 105/00 | (2006.01) | |
| B29L 7/00 | (2006.01) | |
| B29L 31/30 | (2006.01) | |

(52) U.S. Cl.
CPC .......... *B29C 59/16* (2013.01); *B29C 35/0266* (2013.01); *B29C 71/04* (2013.01); *B29C 35/0866* (2013.01); *B29C 51/002* (2013.01); *B29C 51/12* (2013.01); *B29C 51/264* (2013.01); *B29C 51/46* (2013.01); *B29C 59/04* (2013.01); *B29C 2035/0877* (2013.01); *B29K 2023/06* (2013.01); *B29K 2023/12* (2013.01); *B29K 2105/04* (2013.01); *B29K 2105/243* (2013.01); *B29K 2105/256* (2013.01); *B29L 2007/001* (2013.01); *B29L 2031/3005* (2013.01); *Y10T 428/268* (2015.01)

(58) Field of Classification Search
CPC ........... B29C 2035/0877; B29C 51/00; B29C 35/0266; B29C 51/002; B29C 59/04; B29C 59/16; B29C 71/04; B29C 51/12; B29C 51/264; B29C 51/46; B29C 35/0866; B29K 2023/06; B29K 2023/12; B29K 2105/04; B29K 2105/243; B29K 2105/256; B29L 2007/001; B29L 2031/3005; Y10T 428/268

USPC .......................................................... 264/485
See application file for complete search history.

(56) References Cited

U.S. PATENT DOCUMENTS

| | | | | |
|---|---|---|---|---|
| 3,144,399 | A * | 8/1964 | Rainer .................... | B29C 71/04 156/272.2 |
| 3,467,244 | A * | 9/1969 | Hamilton ................ | B65D 75/28 206/524.8 |
| 3,519,527 | A * | 7/1970 | Crowley .................. | B32B 27/00 156/79 |
| 3,657,533 | A * | 4/1972 | Spillers ................... | B29C 71/04 250/453.11 |
| 3,734,496 | A * | 5/1973 | Rubin ...................... | A63B 5/11 182/139 |
| 3,741,253 | A * | 6/1973 | Brax ................... | B29C 47/0023 138/137 |
| 3,899,807 | A * | 8/1975 | Sovish ................ | B29C 61/0616 138/156 |
| 3,959,052 | A * | 5/1976 | Stanek .................... | B29C 61/10 156/244.11 |
| 4,056,421 | A * | 11/1977 | Jarvis .................. | B29C 35/0894 156/218 |
| 4,178,220 | A * | 12/1979 | Fowler .................... | B29C 71/04 250/492.3 |
| 4,323,607 | A * | 4/1982 | Nishimura ............ | B29C 61/003 156/84 |
| 4,366,201 | A * | 12/1982 | Changani ................ | B29C 61/10 138/103 |

(Continued)

FOREIGN PATENT DOCUMENTS

| | | | |
|---|---|---|---|
| DE | 4007877 | * | 9/1991 |
| DE | 10018196 A1 | | 11/2001 |

(Continued)

OTHER PUBLICATIONS

Translation of German Patent Document DE4007877, Heitz et al., Sep. 19, 1991, 9 pages.*

(Continued)

*Primary Examiner* — Jeffrey Wollschlager
(74) *Attorney, Agent, or Firm* — Laurence A. Greenberg; Werner H. Stemer; Ralph E. Locher

(57) ABSTRACT

In a method for producing a thermoplastic film having a three-dimensionally textured, embossed surface, the film is subjected prior to a subsequent shaping kind of processing step to electron-beam crosslinking, which differently crosslinks the individual surface-area regions of the film, so that the regions that undergo greater degrees of drawing out during deforming have different degrees of crosslinking than their neighboring regions.

13 Claims, No Drawings

(56) References Cited

U.S. PATENT DOCUMENTS

| | | | |
|---|---|---|---|
| 4,369,356 A * | 1/1983 | Tsurutani | B29C 61/0625 |
| | | | 174/DIG. 8 |
| 4,397,804 A * | 8/1983 | Medwed | B29C 51/04 |
| | | | 264/292 |
| 4,407,881 A | 10/1983 | Shima et al. | |
| 4,447,488 A * | 5/1984 | Simm | B29C 59/16 |
| | | | 428/213 |
| 4,457,817 A | 7/1984 | Bobeth et al. | |
| 4,491,616 A * | 1/1985 | Schmidle | D06N 7/0028 |
| | | | 427/272 |
| 4,740,335 A * | 4/1988 | Scholz | B29C 51/426 |
| | | | 264/210.2 |
| 4,828,947 A | 5/1989 | Sato et al. | |
| 4,868,022 A * | 9/1989 | Marx | B29C 66/73712 |
| | | | 138/155 |
| 4,891,173 A * | 1/1990 | Saitoh | C08J 3/245 |
| | | | 264/210.2 |
| 5,029,241 A * | 7/1991 | Robinson | B29C 61/0608 |
| | | | 174/88 R |
| 5,127,974 A * | 7/1992 | Tomiyama | B29C 51/16 |
| | | | 150/166 |
| 5,227,233 A * | 7/1993 | Itaba | G09F 3/04 |
| | | | 427/208.6 |
| 5,250,332 A * | 10/1993 | Kupczyk | B29C 61/0608 |
| | | | 138/123 |
| 5,344,691 A * | 9/1994 | Hanschen | B29C 55/023 |
| | | | 428/152 |
| 5,407,610 A * | 4/1995 | Kohama | B29C 51/14 |
| | | | 264/236 |
| 5,993,922 A * | 11/1999 | Babrowicz | B29C 35/10 |
| | | | 264/211.12 |
| 6,242,504 B1 * | 6/2001 | Meyer-Roscher | B05D 3/067 |
| | | | 156/272.2 |
| 6,365,089 B1 * | 4/2002 | Krebs | A61L 27/16 |
| | | | 264/320 |
| 6,663,738 B2 | 12/2003 | Ohlinger et al. | |
| 6,818,171 B2 * | 11/2004 | Wang | A61F 2/30 |
| | | | 264/478 |
| 6,913,728 B2 | 7/2005 | Vogt et al. | |
| 2001/0026907 A1 * | 10/2001 | Husemann | B29C 35/0266 |
| | | | 430/396 |
| 2002/0157767 A1 * | 10/2002 | Neuhaus-Steinmetz | B05D 3/068 |
| | | | 156/183 |
| 2002/0197482 A1 * | 12/2002 | Tukachinsky | B32B 1/02 |
| | | | 428/421 |
| 2003/0072917 A1 * | 4/2003 | Campbell | B29C 39/10 |
| | | | 428/141 |
| 2003/0203160 A1 * | 10/2003 | Nehring | B29C 51/10 |
| | | | 428/141 |
| 2004/0108625 A1 * | 6/2004 | Moder | B29C 51/082 |
| | | | 264/510 |
| 2004/0132854 A1 * | 7/2004 | Du Plessis | C08J 3/244 |
| | | | 522/114 |
| 2004/0234771 A1 * | 11/2004 | Meyer | B29C 51/002 |
| | | | 428/412 |
| 2005/0173047 A1 * | 8/2005 | Buhring | B29C 71/04 |
| | | | 156/220 |
| 2006/0055089 A1 * | 3/2006 | Zhang | C08L 53/00 |
| | | | 264/485 |
| 2006/0142868 A1 * | 6/2006 | Mimnaugh | A61F 2/3886 |
| | | | 623/20.32 |
| 2008/0011377 A1 * | 1/2008 | Van Hooren | B29C 35/0266 |
| | | | 138/118 |

FOREIGN PATENT DOCUMENTS

| | | |
|---|---|---|
| DE | 10202752 A1 | 7/2005 |
| DE | 10356665 A1 | 7/2005 |
| DE | 102005009415 A1 | 9/2006 |

OTHER PUBLICATIONS

Lazar, M, et al., "Crosslinking of Polyolefins", Advances in Polymer Science, vol. 95/1990 (1990) pp. 149-197.

Lewis, R.J., Sr., "Hawley's Condensed Chemical Dictionary" 2007, John Wiley & Sons, 15th Ed., pp. 346.

* cited by examiner

METHOD FOR PRODUCING A THERMOPLASTIC FILM

CROSS-REFERENCE TO RELATED APPLICATION

This is a divisional of application Ser. No. 12/206,277, filed Sep. 8, 2008; which was a continuation, under 35 U.S.C. § 120, of International application PCT/EP2007/050325, filed Jan. 15, 2007; the application also claims the priority, under 35 U.S.C. § 119, of German patent application No. DE 10 2006 011 159.1, filed Mar. 10, 2006; the prior applications are herewith incorporated by reference in their entirety.

BACKGROUND OF THE INVENTION

Field of the Invention

The invention relates to a method for producing a thermoplastic film having a three-dimensionally structured surface, the film already provided with a surface structure in a preceding shaping step being subjected to a further shape-imparting processing step, in particular shape-imparting thermoforming, in which the film acquires its component form. The invention also relates to a film for a processing step including shaping.

The preceding shaping step in which the film is provided with a surface structure contains as a rule an embossing method. Familiar as the subsequent shape-imparting processing step is not only thermoforming but of course a number of further forming methods, such as, for example, pressure or pressing methods in which the film is pressed against molds and acquires its component form.

Thermoplastic film having a three-dimensionally structured, embossed surface, i.e. for example grained, patterned or finely structured molded plastic skins, are widely known as surfaces for articles and are used, for example, for the interior cladding in vehicles, here often as relatively flexible foam-backed films, so-called foam films, having pleasant haptic properties, for example for the cladding of dashboards or the interior shells of doors, etc. With appropriate adaptation of strength and design, such films are of course also used for other goods provided with a high-quality coating.

The prior art discloses various methods for producing such molded skins, for example rolling methods for producing "continuous" film webs or methods for producing individual molded skins directly from the mold. Here, however, the rolling methods in which a thermoplastic film is provided with a surface structure with the aid of an embossing roll are discussed below.

In relation to the following deformation processes, the person skilled in the art is familiar with the problem that, on application of a film to a three-dimensional component, i.e. for example in a drawing process in which a film provided with a uniformly embossed surface is drawn into a mold (thermoforming) or is clamped over a fixed support or base body, deformations of the film can of course occur which go beyond the limit of elasticity of the material of which the work piece consists. Distortions may arise as a result of changing distances between the individual surface regions, which are immediately evident to the viewer as irregularities. Since a strong trend toward improving the quality impression is to be observed in the region of the interior of automobiles, such irregularities are less and less acceptable.

In this context, German patent DE 102 02 752, corresponding to U.S. Pat. No. 6,913,728, discloses a process for the production of a shaped article which is thermoformed from a thermoplastic film and in which the surface structure of the embossing roll is densified or reduced in size in the regions in which an expansion of the thermoplastic film takes place during the thermoforming process. This compensation then results in a uniform surface pattern during thermoforming. Here, however, the embossing roll or the outer roll surface serving as a negative must be processed in the form of a silicone tube in a relatively complicated manner in order to establish the compensating pattern densifications.

Published, non-prosecuted German patent application DE 100 18 196 A1, corresponding to U.S. Pat. No. 6,663,738, describes a process for the production of a grained film from uncrosslinked polyolefins, which is treated with electron beams to increase the grain tightness and is then thermoformed. Since the film as a whole has a more stable and hence less deformable grain as a result of such a process, only the elongation as a whole is reduced but the problem of the required different elongation of individual regions of the film is not satisfactorily solved.

SUMMARY OF THE INVENTION

It is accordingly an object of the invention to provide a method for producing a thermoplastic film which overcomes the above-mentioned disadvantages of the prior art methods of this general type, and which presents an economical process by which a film suitable for subsequent shape-imparting processing, in particular for thermoforming, can be produced, which process permits different deformations/elongations over the individual surface regions of the film without permitting visible distortions due to changing distances between individual surface structures to be recognizable.

With the foregoing and other objects in view there is provided, in accordance with the invention, a process for crafting a thermoplastic film having a three-dimensionally structured surface. The process includes the steps of providing a film having a surface structure formed in a preceding shaping step; subjecting the film to electron beam crosslinking for crosslinking individual regions of the film differently and substantially in a manner such that regions subjected to higher degrees of drawing in a subsequent shape-imparting processing step have degrees of crosslinking differing from neighboring regions; and subsequently subjecting the film to a shape-imparting processing step.

Here, the film, which as a rule was extruded, already embossed and, if appropriate, also already coated, is subjected before the subsequent shape-imparting processing step to electron beam crosslinking which crosslinks the individual extensive regions of the film differently and substantially in a manner such that the regions which are subjected to higher degrees of drawing in the subsequent shape-imparting processing step have degrees of crosslinking differing from their neighboring regions.

Other features which are considered as characteristic for the invention are set forth in the appended claims.

Although the invention is described herein as embodied in a method for producing a thermoplastic film, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DETAILED DESCRIPTION OF THE INVENTION

The crosslinking of polymers takes place through formation of covalent bonds between the polymer chains. Usually, the crosslinking is effected by the classical vulcanization with elemental sulfur or silanes, by peroxide crosslinking, by crosslinking with electron beams or by a combination of the methods. In electron beam crosslinking, the free radicals initiating the crosslinking process form through the action of high-energy radiation on the polymer molecules. The accelerated electrons interact with the irradiated molecules. The kinetic energy of the electrons is transferred to atoms with the molecular assembly by elastic impacts. The atoms affected are thus converted into a more highly excited state. If the energy thus supplied is greater than the bond energy of the covalent bonds, the bond is cleaved and free radicals, macroradicals and ions form.

The free radicals react in subsequent reactions with the molecules of the polymer chains or with themselves and lead both to the formation of covalent bonds between the individual chains and to the degradation of the macromolecules by chain cleavage. Chain cleavage and chain synthesis take place in parallel. The polymer type used and the processing conditions, such as radiation dose, type of radiation, temperature, etc. determine which reaction dominates. Establishing process parameters in electron beam crosslinking is therefore of primary importance. Since chain degradation also takes place, crosslinking of all polymer chains present with one another cannot be realized. Although complete crosslinking is not achieved by radiation crosslinking, main features of the irradiated polymers are nevertheless strongly influenced.

The crosslinking points newly formed during crosslinking induced by electron beams hinder the folding process of the polymer chains. This results in a reduction in the crystallinity, in particular the mechanical strength and brittleness decreasing with decreasing crystallinity whereas toughness and insulation properties increase. In most cases, however, a decrease in the strength which is to be expected owing to the decrease in crystallinity does not in fact occur. The reason for this is that the lower crystallinity is overcompensated by the increased structural strength of the crosslinked amorphous regions. The cohesive forces between the crosslinked polymer chain segments are several times greater than in the uncrosslinked state, where only van der Waals interaction forces act between the chains. The sliding and displacement of the polymer chains are made substantially more difficult as a result of the crosslinking. These changes manifest themselves, for example, in an increase in the mechanical strength and the heat distortion resistance.

Because the regions which are subjected to higher degrees of drawing in the subsequent shape-imparting processing step have degrees of crosslinking differing from their neighboring regions, in particular and advantageously higher degrees of crosslinking, an extremely uniform surface structure is retained even after the subsequent deformation step, for example after the application of the film to a three-dimensional component.

This is because the strongly formed film regions, i.e. for example those on projecting geometries having small radii, extend to a greater degree than the neighboring regions and therefore transmit the deformation stresses to the neighboring region. Viewed over the total area, the surface tension of the film after the deformation then becomes uniform. As a result, the surface structure is also substantially retained, but in any case so that a change is not noticeable to the naked eye. In the conventional processes in the prior art, the regions having higher degrees of drawing had to adsorb the total elongation alone, i.e. for example were elongated by 60%, while the directly adjacent regions were not elongated. The differences in the structure were therefore often noticeably large. In the process according to the invention, the elongation of the regions having higher degrees of drawing is greatly reduced by the crosslinking, with the result that transmission of the forming stresses also takes place to the adjacent regions so that both regions are elongated by approximately equal amounts of, for example 25-30%. Structural differences in the transition between the regions are thus substantially reduced.

A distribution of the newly formed crosslinking points which is inhomogeneous over the film surface, i.e. the crosslinking density distribution or network arc density—for example expressed by the gel content as a known measure for the crosslinking—can be particularly advantageously achieved if the film is exposed from both sides to electron radiation, it being possible for the degrees of crosslinking to be different on the two film sides or film surfaces.

As a result, the total crosslinking of individual regions can be influenced both via the irradiated area and via the radiation intensity and thereby influenceable effect of the crosslinking in the thickness direction of the film.

In the case of irradiation on one side, the region of maximum dose adsorption can be varied and hence defined in the case of the crosslinking density distribution by the choice of the acceleration voltage for the electrons, depending on the film thickness.

In the case of irradiation on two sides, the crosslinking density distribution can moreover be influenced by the relation of the applied doses with variation of the respective acceleration voltage. Depending on the respective compositions of the films to be irradiated, these have to be adapted again for each chemical system.

In an advantageous further development, the electron beam crosslinking of the film is effected by irradiation of at least one film surface with an electron beam source several times at least in regions. The desired difference in the crosslinking can be produced simply through the simple local control of the radiation source of the electron beam. Since the films to be processed are usually present as web material, the width of the film webs being determined by the preceding production, it is of course possible in the context of the invention to carry out different irradiation variants which are adapted to the further processing of the film web. If, for example, it is certain that the middle region of a film web is always that which occurs in the region of the instrument cover of a dashboard during the subsequent shaping and hence masked bear the greatest degrees of drawing, it is just this middle region of the film which is crosslinked once or several times according to the invention.

An advantageous further development relates in carrying out the electron beam crosslinking of the film surface line by line in succession, the beam width of the electron beam being adjustable by use of an aperture. With the aid of such "scanning", a degree of crosslinking differing over the film width can be established in a simple manner.

This also applies to another advantageous further development which relates to arranging a mask, which changes the intensity of the electron radiation at least in partial regions of the beam cross section, between the electron beam source and the irradiated film surface.

A thermoplastic film of crosslinked polymeric material having a three-dimensionally structured, embossed surface which is formed of a thermoplastic elastomer, in particular a thermoplastic olefin (TPO) or a polyolefin mixture, is particularly suitable for use in the process according to the invention.

The particular advantage of using this polymer type in the case of the film according to the invention is that the originally present intermolecular crosslinking of a thermoplastic olefin (hydrogen bridges, crystalline structures) is predominantly thermoreversible and substantially of a physical nature, which is fundamental with regard to the suitability for deformation. The "additional" electron beam crosslinking of certain regions of the polyolefin provides the particular and surprising property of the film in which on the one hand elongation behavior required for the forming and on the other hand sufficient resistance to excessive elongations of the surface for reliable material handling of the process are present during the forming step usually taking place at elevated temperature.

In another advantageous further development, the film formed of precrosslinked polymeric materials, in particular of a composition of polypropylene, polyethylene and copolymers and terpolymers thereof, which are particularly suitable for use as a film for a motor vehicle interior. This too gives a particularly uniform surface structure without striking excess elongations after the subsequent deformation step. The precrosslinking is effected by chemical method by addition of customary crosslinking agents.

In another advantageous further development, the film is in the form of a multilayer polymer film composite. Such a formation promotes the influenceable effect of the crosslinking in the thickness direction of the film and hence the total crosslinking of individual film regions.

The constituents of the polymer films are preferably polyolefins. The range of polyolefins which may be used is not subject to any fundamental limitation. Polyolefins, such as PP, PE, poly(1-butene), polyisobutylene, poly(4-methylpentene), PP copolymer or terpolymers with $C_2$, $C_4$-$C_{12}$-$\alpha$-olefins, PE copolymers or terpolymers with $C_3$ to $C_{12}$-$\alpha$-olefins or mixtures thereof can preferably be used, it also being possible to use as co- or termonomers diene monomers which contain nonconjugated double bonds, such as, for example, 1,4-hexadiene, 5-methyl-1,5-hexadiene, 5-ethylidene-2-norbornene, 5-butylidene-2-norbornene, dicyclopentadiene, 1,4-octadiene, cyclohexadiene or cyclooctadiene; copolymers of propylene and/or ethylene with polar comonomers, such as acrylic acid and/or the $C_1$-$C_{12}$-esters thereof, methacrylic acid and/or the $C_1$-$C_{12}$-esters thereof, ionomers based on acrylic acid and/or with methacrylic acid and sulfuric acid, vinyl esters of saturated $C_1$-$C_8$-carboxylic acids, optionally with carbon monoxide as a termonomer; graft copolymers of propylene and/or ethylene having 8-45% of grafted-on units of unsaturated carboxylic acids, dicarboxylic acids, the esters and/or anhydrides thereof and mixtures of the polymers.

In another advantageous further development, the film has a thickness of from 0.4 to 4 mm. As a result, the adjustability of the depth of crosslinking is further facilitated.

With the aim of making the elongation highly uniform, the crosslinking of the film is advantageously adjusted so that, in the regions which are subjected to higher degrees of drawing in the subsequent shape-imparting processing step, the film has a gel content of at least 30%, preferably a gel content of from 40 to 60%. As a result, the grain tightness of the elongated regions of the film is sufficiently high to prevent a distortion of the surface structure/grain structure, the other regions of the film which have the lower gel content providing sufficient extensibility to achieve reliable deformation in the process for covering a three-dimensional component.

In an advantageous development, the difference in the gel content between regions of the film which have a high degree of crosslinking and a low degree of crosslinking is from 10 to 60%, preferably from 20 to 50%. As a result, sufficient uniformity of the elongations of the material is achieved even in the case of strongly deformed components, such as, for example, in the case of covers for the transmission tunnel of a car.

The determination of the gel content is usually effected via an extraction method in which first samples with a thickness of about 0.5 mm are cut into squares having an edge length of about 1.0 mm. The samples (about 100 mg) are then initially introduced into test tubes which are provided with plugs which are made of stainless steel wire and prevent the samples from floating. The test tubes are filled with 100 ml of xylene and closed with aluminum foil in order to prevent evaporation of the solvents. The xylene is then heated to the boil. The test specimens are left in the boiling xylene for about 24 h. Thereafter, the gel-xylene mixture is filtered over a drum screen having a mesh size of 200 mesh, the gel remaining in the drum screen. The drum screens are placed on metal plates and dried at 140° C. for 3 h in a through-circulation oven. After cooling to room temperature, the content is weighed out and related to the sample weight.

The abovementioned production process can be particularly advantageously used for a dashboard for the interior cladding of motor vehicles with an outer surface in the form of a foam-backed film. Such dashboards often have highly formed regions which are directly and permanently visible to driver and passenger. This applies, for example, to the instrument cover, to the glove compartment and to ventilation nozzles and cut-outs. Here, making the elongations uniform, as is achieved in the film by the process according to the invention, is particularly important for esthetic reasons.

The invention claimed is:

1. A process for crafting a thermoplastic film having a three-dimensionally structured surface, the process comprising the steps of:
   providing a film having a surface with an embossed surface structure formed in an embossing method of a preceding shaping step;
   subjecting the film to electron beam crosslinking for crosslinking individual regions of the film surface differently from each other and substantially in a manner such that regions of the film surface subjected to higher degrees of drawing in a subsequent shape-imparting processing step have degrees of crosslinking differing from neighboring regions of the film surface;
   performing the electron beam crosslinking by applying doses of radiation on two sides of the film such that the degrees of crosslinking on the two sides of the film are different due to the radiation; and
   subsequently subjecting the film to the shape-imparting processing step.

2. The process according to claim 1, wherein the regions subjected to higher degrees of drawing in the subsequent shape-imparting processing step have higher degrees of crosslinking than the neighboring regions.

3. The process according to claim 1, which further comprises effecting the electron beam crosslinking of the film by irradiation of at least one film surface with an electron beam source several times at least in regions.

4. The process according to claim 1, which further comprises:
   carrying out the electron beam crosslinking of a film surface line by line in succession; and
   adjusting a beam width of the electron beam with an aid of an aperture.

5. The process according to claim 3, which further comprises disposing a mask which changes an intensity of electron radiation at least in partial regions of a beam cross section between an electron beam source and an irradiated film surface.

6. The process according to claim 1, which further comprises performing a shape-imparting thermoforming step as the shape-imparting processing step.

7. The process according to claim 1, which further comprises providing the thermoplastic film as a multilayer polymer film composite.

8. The process according to claim 1, which further comprises providing the thermoplastic film with a thickness of 0.4 to 4 mm.

9. The process according to claim 1, which further comprises providing the regions subjected to higher degrees of drawing in the subsequent shape-imparting processing step with a gel content of at least 30%.

10. The process according to claim 1, which further comprises providing the regions subjected to higher degrees of drawing in the subsequent shape-imparting processing step with a gel content of 40 to 60%.

11. The process according to claim 1, which further comprises providing a difference in a gel content between regions of the film which have a high degree of crosslinking and regions of the film which have a low degree of crosslinking to be from 10 to 60%.

12. The process according to claim 1, which further comprises providing a difference in a gel content between regions of the film which have a high degree of crosslinking and regions of the film which have a low degree of crosslinking to be from 20 to 50%.

13. The process according to claim 1, wherein the shape-imparting processing step includes drawing the film into a mold.

\* \* \* \* \*